US006689831B1

(12) United States Patent
McMillen et al.

(10) Patent No.: US 6,689,831 B1
(45) Date of Patent: Feb. 10, 2004

(54) CHROMIUM-FREE, CURABLE COATING COMPOSITIONS FOR METAL SUBSTRATES

(76) Inventors: Mark McMillen, 4120 Al Bert Ct., Oxford, MI (US) 48371; William D. Krippes, 712 Tucker La., Howell, MI (US) 48843; Emmanuel T. Hernandez, 4985 Danbury, Troy, MI (US) 48098

( * ) Notice: Subject to any disclaimer, the term of this patent is extended or adjusted under 35 U.S.C. 154(b) by 622 days.

(21) Appl. No.: 09/704,373

(22) Filed: Nov. 1, 2000

(51) Int. Cl.[7] ................................................. C08K 3/10
(52) U.S. Cl. ....................................... 524/413; 524/515
(58) Field of Search ......................................... 524/413

(56) References Cited

U.S. PATENT DOCUMENTS

| | | | | |
|---|---|---|---|---|
| 3,755,018 | A | 8/1973 | Miller | 148/6.21 |
| 3,895,969 | A | 7/1975 | Miller | 148/6.2 |
| 4,067,837 | A | 1/1978 | Miller | 260/29.6 |
| 4,069,187 | A | 1/1978 | Miller | 260/29.6 |
| 4,088,621 | A | 5/1978 | Miller | 260/29.6 |
| 4,137,368 | A | 1/1979 | Miller | 428/461 |
| 4,138,276 | A | 2/1979 | Miller | 148/6.2 |
| 4,154,620 | A | 5/1979 | Miller | 106/302 |
| 4,179,305 | A | 12/1979 | Miller | 106/292 |
| 5,282,905 | A | 2/1994 | Reichgott et al. | 148/247 |
| 5,294,265 | A | 3/1994 | Gray et al. | 148/250 |
| 5,306,526 | A | 4/1994 | Gray et al. | 427/309 |
| 5,328,525 | A | 7/1994 | Musingo et al. | 148/247 |
| 5,478,872 | A | * 12/1995 | Yamasoe et al. | 524/45 |
| 5,500,053 | A | 3/1996 | Ouyang et al. | 427/247 |
| 5,801,217 | A | 9/1998 | Rodzewich et al. | 523/409 |
| 5,895,532 | A | 4/1999 | Nakamura et al. | 148/247 |

FOREIGN PATENT DOCUMENTS

| | | |
|---|---|---|
| WO | WO 99/29927 | 6/1999 |
| WO | WO 99/64544 | 12/1999 |

* cited by examiner

Primary Examiner—Bernard Lipman
(74) Attorney, Agent, or Firm—Diane R. Meyers; Deborah M. Altman

(57) ABSTRACT

A curable emulsion coating composition essentially free of chromium is provided. The composition comprises a continuous waterborne phase and a discontinuous phase. The discontinuous phase comprises at least one water-insoluble, particulate film-forming thermoplastic resin, at least one water-insoluble, film-forming thermosetting resin, and at least one water-insoluble alkali metal salt of a heavy metal-containing acid. The heavy metal may be selected from titanium, zirconium, and mixtures thereof. The heavy metal salt is present in the coating composition in an amount of 0.05 to 15 percent by weight, based on the total weight of the composition. The composition is suitable for use over a variety of metal substrates as a pretreatment coating or as a direct-to-metal primer. Also provided is a process for coating a metal substrate by contacting the substrate with the curable composition described above and heating the coated substrate to a peak metal temperature of 170 to 350° F. (77 to 177° C.). The coated metal substrate has a cured coating weight of 250–400 mg/ft$^2$.

26 Claims, No Drawings

CHROMIUM-FREE, CURABLE COATING COMPOSITIONS FOR METAL SUBSTRATES

BACKGROUND OF THE INVENTION

The present invention relates to curable, protective coating compositions for metal substrates prior to the application of one or more decorative coatings.

Conversion coatings used alone, or prior to the application of a protective or decorative coating, are well known for promoting corrosion resistance. The conversion coatings are usually applied by immersion, spray, or roller, and are dried in place at room temperature. Chrome-containing, film-forming protective coating compositions are also known and are disclosed, for example, in U.S. Pat. No. 4,069,187. Such compositions may be suitable for use in pretreatment processes as conversion coatings and/or as primers. They are highly suitable in the electronics industry because of their "anti-fingerprint" properties, providing enhanced adhesion to subsequently applied coatings.

A drawback of these conventional pretreatment compositions is that they typically contain chromium and other heavy metals, such as nickel, producing waste streams that require expensive treatment and disposal due to environmental concerns.

Chrome-free pretreatment coatings have been developed but are typically not curable and are effective for corrosion inhibition only over a limited variety of substrates.

SUMMARY OF THE INVENTION

It is an object of the present invention to provide a curable coating composition, which is substantially free of chrome, for use as a conversion coating or primer on metal substrates prior to the application of a decorative coating. It is a further object of the invention to provide a composition that is effective for use on a number of metal substrates, particularly metal objects fabricated with more than one substrate type, so that the need to perform separate passivating treatments would be eliminated. It is a further object of the invention to provide a composition that is effective for use on untreated (i.e. non-phosphated) metal substrates as a direct-to-metal primer, providing enhanced corrosion resistance while maintaining adhesion to subsequently applied coating layers. Such compositions may find utility in the electronics industry.

In accordance with the present invention, a curable emulsion coating composition, essentially free of chromium, is provided. The composition comprises a continuous waterborne phase and a discontinuous phase. The discontinuous phase comprises at least one water-insoluble, particulate film-forming thermoplastic resin, at least one water-insoluble, film-forming thermosetting resin, and at least one water-insoluble alkali metal salt of a heavy metal-containing acid. The heavy metal may be selected from titanium, zirconium, and mixtures thereof. The heavy metal salt is present in the coating composition in an amount of 0.05 to 15 percent by weight, based on the total weight of the composition. Also provided is a process for coating a metal substrate by contacting the substrate with the composition of the present invention and heating the coated substrate to a peak metal temperature of 170 to 350° F. (77 to 177° C.). The coated metal substrate has a cured coating weight of 250–400 mg/ft$^2$.

DETAILED DESCRIPTION

Other than in the operating examples, or where otherwise indicated, all numbers expressing quantities of ingredients or reaction conditions used in the specification and claims are to be understood as modified in all instances by the term "about".

The composition of the present invention is typically used to treat steel surface-treated with any of zinc metal, zinc compounds and zinc alloys (including electrogalvanized steel, hot-dipped galvanized steel, GALVANNEAL steel, and steel plated with zinc alloy). Also, aluminum, aluminum alloys, zinc-aluminum alloys such as GALFAN, GALVALUME, aluminum plated steel and aluminum alloy plated steel substrates may be used.

The substrate may alternatively comprise more than one metal or metal alloy, in that the substrate may be a combination of two or more metal substrates assembled together, such as hot-dipped galvanized steel assembled with aluminum substrates. Other substrate combinations that are commonly used in the coil industry and in other industrial applications are suitable as well.

The composition used in the process of the present invention may be applied to either bare metal or pretreated metal in the process of the present invention. By "bare" is meant a virgin metal substrate that has not been treated with any pretreatment compositions such as conventional phosphating baths, heavy metal rinses, etc. Additionally, bare metal substrates being coated with the composition of the present invention may be a cut edge of a substrate that is otherwise treated and/or coated over the rest of its surface.

The substrate to be coated is usually first cleaned to remove grease, dirt, or other extraneous matter. Conventional cleaning procedures and materials may be employed. These would include mild or strong alkaline cleaners such as are commercially available and conventionally used in metal pretreatment processes. Examples of alkaline cleaners include BASE Phase Non-Phos or BASE Phase #6, both of which are available from PPG Industries, Pretreatment and Specialty Products. Such cleaners are generally followed and/or preceded by a water rinse.

Optionally, the metal surface may be rinsed with an aqueous acidic solution after cleaning with the alkaline cleaner and before contact with the composition. Examples of rinse solutions include mild or strong acidic cleaners such as the dilute nitric acid solutions commercially available and conventionally used in metal pretreatment processes.

Although pretreatment of the metal substrate is not necessary, the metal substrate may optionally be pretreated with a solution selected from the group consisting of a metal phosphate solution, an organophosphate solution, an organophosphonate solution, and combinations thereof. Suitable metal phosphate coating compositions may be any of those known in the art. Examples include zinc phosphate, iron phosphate, manganese phosphate, calcium phosphate, magnesium phosphate, cobalt phosphate, zinc-iron phosphate, zinc-manganese phosphate, zinc-calcium phosphate, and layers of other types, which may contain one or more multivalent cations. Phosphating compositions are known to those skilled in the art and are described in U.S. Pat. Nos. 4,941,930, 5,238,506, and 5,653,790. Preferred compositions include organophosphate and organophosphonate pretreatment compositions such as those disclosed in U.S. Pat. Nos. 5,294,265 and 5,306,526.

Following the optional cleaning and pretreating steps, the metal surface is contacted with the curable coating composition of the present invention. The composition of the present invention may be applied to the metal substrate by known application techniques, such as dipping or immersion, spraying, intermittent spraying, dipping followed by spraying, spraying followed by dipping, brushing, or by roll-coating. Roller application is preferred.

The composition of the present invention is an emulsion. It is essentially free of chromium and comprises a continuous waterborne phase and a discontinuous phase. The discontinuous phase comprises at least one water-insoluble, particulate film-forming thermoplastic resin, at least one water-insoluble, film-forming thermosetting resin, and at least one water-insoluble alkali metal salt of a heavy metal-containing acid. The heavy metal may be selected from titanium, zirconium, and mixtures thereof. With respect to the heavy metal salt, by "water-insoluble" is meant that the salt has a solubility in water of no more than about 1.3 g/100 ml at a temperature of 20° C.

Suitable thermoplastic resins may be selected from acrylic polymers, vinyl polymers, polyesters, polyepoxides, and mixtures thereof. Acrylic polymers may be copolymers of one or more alkyl esters of acrylic and/or methacrylic acid optionally together with one or more other polymerizable ethylenically unsaturated (vinyl or allylic) monomers. Suitable alkyl esters of acrylic acid or methacrylic acid ("(meth) acrylates") include methyl(meth)acrylate, ethyl(meth) acrylate, propyl(meth)acrylate, n-butyl(meth)acrylate, t-butyl(meth)acrylate, isobutyl(meth)acrylate, 2-ethylhexyl (meth)acrylate, lauryl(meth)acrylate, cyclohexyl(meth) acrylate, t-butylcyclohexyl(meth)acrylate, trimethylcyclohexyl(meth)acrylate, isobornyl(meth) acrylate, and the like. Other suitable ethylenically unsaturated monomers include allylic monomers and vinyl aromatic compounds such as styrene and vinyl toluene, nitriles such as acrylonitrile and methacrylonitrile, vinyl and vinylidene halides such as vinyl chloride and vinylidene fluoride and vinyl esters such as vinyl acetate. The non-acrylic ethylenically unsaturated monomers may be copolymerized to form a vinyl polymer free of acrylic groups.

The acrylic and vinyl polymers may be prepared by conventional free radical initiated polymerization techniques, such as solution or emulsion polymerization, known in the art using suitable catalysts which include organic peroxides and azo compounds, and optionally chain transfer agents such as alpha-methyl styrene dimer and tertiary dodecyl mercaptan.

The thermoplastic resin may also be a polyester. Polyesters may be prepared in a known manner by condensation of polyhydric alcohols with polycarboxylic acids. Suitable polyhydric alcohols include, for example, ethylene glycol, propylene glycol, butylene glycol, 1,6-hexane diol, neopentyl glycol, diethylene glycol, glycerol, trimethylol propane, and pentaerythritol.

Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Functional equivalents of the acids mentioned above such as anhydrides where they exist or lower alkyl esters such as methyl esters may be used.

Polyepoxides may be prepared as acrylic polymers using epoxy functional monomers such as glycidyl(meth)acrylate, 3,4-epoxycyclohexylmethyl(meth)acrylate, 2-(3,4-epoxycyclohexyl)ethyl(meth)acrylate, and allyl glycidyl ether. Polyepoxides may alternatively be polyglycidyl ethers of polycyclic polyols. These polyepoxides can be prepared by etherification of polycyclic polyols with an epihalohydrin or dihalohydrin such as epichlorohydrin or dichlorohydrin in the presence of alkali. The polyepoxide may be chain extended to increase molecular weight using a polyhydroxyl group-containing material such as simple polyols including the polyhydric alcohols listed above, polyester polyols, and polyether polyols.

A preferred thermoplastic resin is a 100% acrylic emulsion polymer comprising 45±5% by weight solids having a pH of 7 to 11 and weighing approximately 8.5 to 8.9 pounds per gallon. Such acrylic emulsion polymers are available commercially under the name Rhoplex MV-1C, Rhoplex MV-117 or Rhoplex WL-91, from Rohm and Haas Company. The thermoplastic resin, which may be a mixture of resins, is present in the composition of the present invention in an amount of up to 60 percent by weight, preferably 35 to 45 percent by weight, based on the total weight of the composition.

The discontinuous phase of the composition further comprises at least one film-forming thermosetting resin, rendering the composition of the present invention curable. Thermosetting resins contain functional groups that allow for curing to take place, either self-curing or crosslinking with a crosslinking agent. The thermosetting resins may be selected from acrylic polymers, vinyl polymers, polyesters, polyepoxides, and mixtures thereof, prepared from components as discussed above. A preferred acrylic thermosetting resin for use in the composition of the present invention is an acrylic emulsion polymer containing 50±1% by weight solids having a pH of 10 to 11 and weighing approximately 8.9 pounds per gallon. Such a resin is available commercially from Rohm and Haas Company under the name Emulsion E-1018. Examples of suitable polyepoxides include polyglycidyl ethers of polyhydric phenols such as the polyglycidyl ether of Bisphenol A.

The thermosetting resin is typically present in the composition of the present invention in an amount of 1 to 20 percent by weight, preferably 5 to 14 percent by weight, based on the total weight of the composition.

The weight ratio of thermoplastic to thermosetting resin in the composition of the present invention is preferably within the range of 6:1 to 3:1, but may be altered as desired. Higher thermosetting resin levels reduce water and vapor sensitivity.

Suitable heavy metal-containing salts for use in the composition of the present invention are compounds of zirconium, titanium, and mixtures thereof. Typical zirconium compounds may be selected from one or more alkali metal salts of hexafluorozirconic acid. Typical titanium compounds may be selected from one or more alkali metal salts of hexafluorotitanic acid. Potassium hexafluorotitanate is preferred. The heavy metal-containing salt is usually present in the composition of the present invention in an amount of 0.05 to 15 percent by weight metal, preferably 7 to 12 percent by weight metal, based on the total weight of the composition.

The discontinuous phase of the composition may further comprise at least one crosslinking agent. Suitable crosslinking agents include polyacids, polyisocyanates, and aminoplasts, which are preferred. Mixtures of crosslinking agents may also be used. Polyacids include any of those known in the art suitable for reacting (crosslinking) with polyepoxides. Polyisocyanates include any of those known in the art suitable for reacting (crosslinking) with polyols.

Useful aminoplast resins are based on the addition products of formaldehyde with an amino or amido group-containing material. Condensation products obtained from the reaction of alcohols and formaldehyde with melamine, urea or benzoguanamine are most common and preferred herein. While the aldehyde employed is most often formaldehyde, other similar condensation products can be made from other aldehydes, such as acetaldehyde, crotonaldehyde, acrolein, benzaldehyde, furfural, glyoxal and the like. The aminoplast resins may contain methylol or similar alkylol groups, and in most instances at least a portion of these alkylol groups are etherified by reaction with an alcohol. Any monohydric alcohol can be employed for this purpose, including methanol, ethanol, propanol, butanol, pentanol, hexanol, heptanol, as well as benzyl alcohol and other aromatic alcohols, cyclic alcohols such as cyclohexanol, monoethers of glycols, and halogen-substituted or other substituted alcohols such as 3-chloropropanol and butoxyethanol. Examples of commercially available aminoplasts include Dynomin UM-15, from CYTEC Industries; Uformite MM-83, from Rohm and Haas Company; and Cymel 303 and Cymel 370, from CYTEC Industries, Inc.

A particularly preferred mixture of resins in the composition of the present invention is a mixture of Emulsion E-1018, an acrylic emulsion thermosetting resin, and Dynomin UM-15, a methylated urea formaldehyde resin used as a crosslinking agent.

If a crosslinking agent such as an aminoplast is used, it is preferably present in an amount at least 25% by weight of the thermosetting resin to be crosslinked.

The discontinuous phase of the composition may further comprise a water-insoluble pigment. Examples include silicon dioxide pigments such as Shieldex AC-3 or Syloid C-809, available from W. R. Grace. A preferred pigment is a reaction product of an inorganic silicofluoride and an inorganic calcium compound preferably selected from the group consisting of calcium oxide, calcium bicarbonate, $Ca(OH)_2$, $CaCO_3$ and mixtures thereof. These pigments may be prepared by mixing equimolecular proportions of the inorganic calcium compound and inorganic silicofluoride in water sufficient to form a thick slurry, neutralizing the resultant mixture, drying and grinding. The reaction is exothermic and should be jacketed and water-cooled. Such pigments are disclosed in U.S. Pat. Nos. 4,154,620 and 4,179,305, incorporated herein by reference.

When included, the pigment is typically present in the composition of the present invention in an amount of up to 10 percent by weight, preferably 3 to 5 percent by weight, based on the total weight of the composition. When pigments are added, the weight ratio of pigment to resin is within the range of 1:99 to 40:60, preferably 5:95 to 40:60.

To prepare the composition of the present invention, the various resins and heavy metal-containing salts are formulated into emulsions in a conventional manner by mixing them in water with optional additives as necessary. Such optional additives include dispersion agents, surfactants, defoamers, coalescing agents, flow control agents, pH control agents, and viscosity control agents. Various pigment dispersants, stabilizers, and surfactants can be used within the emulsion. The preferred dispersant agent is an acrylic polymer comprising a 50±0.5% resin solids content, a pH of 2.5 to 3.5, and a weight of approximately 8.9 pounds per gallon. A commercial product is available from Rohm and Haas Company under the name Acrysol I-62. Conventional defoaming agents can be employed, for example, the silicones, and particular mention can be made of the commercially available products of Drewplus L-475 and Drewplus Y-281, from Ashland Chemicals, Inc. Examples of suitable coalescing agents are tributyl phosphate, and butyl CELLOSOLVE and butyl CARBITOL, both available from Union Carbide Company. Hydrolyzable esters and water-soluble substances detract from shelf life and water- and vapor-insensitivity, and are not preferred for use as coalescing agents. Examples of thickening agents are polyurethane products such as Acrysol RM-8W available from Rohm and Haas Company, and Environ Thickener, available from PPG Industries, Inc. An example of a suitable flow control agent is propylene glycol.

The variety of these additives is quite large in number and while the end product produced will have somewhat different chemical and physical characteristics depending upon the particular additives, except to the extent herein described, the invention is not limited to particular additives.

When included, the optional additives are each individually present in the composition of the present invention in amounts up to 10 percent, preferably up to 5 percent by weight, based on the total weight of the composition.

The pH of the composition is usually from 6.5 to 12, preferably 8 to 10, and is adjusted depending on the substrate to be coated. The pH of the composition may be adjusted using ammonium hydroxide, dimethylethanolamine, and diethylamine. The use of ammonium hydroxide is preferred because it decomposes more easily after the emulsion coating composition has been applied to a substrate and during any subsequent curing process.

After application of the composition to the substrate, the coated substrate is heated. Heating allows for improved adhesion of the composition to the substrate surface and effects the cure of the thermosetting resins in the composition. The heating step may be done by air drying, infrared oven, convection oven, and induction oven. The peak metal temperature to which the metal is heated may vary, depending on the technique used, up to a temperature of 450° F. (232° C.). The peak metal temperature is typically between 260 and 350° F. (127 and 177° C.). Heating usually takes place for a time of 15 to 45 seconds in a convection oven.

The wet film thickness of the applied coating composition can vary, but is generally from 0.05 to 10 mils (1.27 to 254 microns), preferably 0.05 to 0.3 mils (1.27 to 7.62 microns). The coated metal substrate has a cured coating weight of 250–400 $mg/ft^2$, preferably 350–400 $mg/ft^2$.

After application of the composition of the present invention, the metal substrate may be rinsed with water and coated with any of a number of different types of protective or decorative coatings, including additional primer coatings (although additional primers are not necessary) and liquid and/or powder coatings. Such coatings can be applied directly to the passivated substrates and may be done immediately after application of the composition of the present invention, after a drying period at ambient or elevated temperature conditions, or after the heating step as noted above. The methods for applying and curing these subsequent protective or decorative coatings are conventional and are described in the art.

The invention will be further described by reference to the following examples. Unless otherwise indicated, all parts are by weight.

EXAMPLES

Example I

A composition was prepared to determine the suitability of potassium hexafluorotitanate as a corrosion-inhibiting pigment. Fifteen grams of a dispersing agent (ACRYSOL I-62, available from Rohm and Haas Company), 2.5 grams of deionized water, five grams of a flow control agent (propylene glycol), 2.5 grams of a coalescing agent (butyl CARBITOL, available from Union Carbide Company), one gram of ammonium hydroxide, 22.5 grams of an aqueous calcium fluoride slurry, a defoaming agent (DREWPLUS L-475, available from Ashland Chemicals, Inc.), and 21.5 grams total of two silicon dioxide pigments (15 grams SHIELDEX AC-3 and 6.5 grams SYLOID C-809, both available from W R Grace Company) were ground together into a paste. This paste was blended together with two resins (212.5 grams of thermoplastic resin RHOPLEX MV-1C, and 65 grams of thermosetting resin EMULSION E-1018, both available from Rohm and Haas Company), 7.5 grams of an aminoplast (DYNOMIN UM-15, available from CYTEC Industries, Inc.), 15 grams of TRU-KROME AF (with chrome withheld, available from PPG Industries, Inc.), 5.5 grams of a thickening agent (ACRYSOL RM-870, available from Rohm and Haas Company), 36.5 grams of deionized water, and five grams of ammonium carbonate.

After the composition had been properly mixed, three samples of 20.0 grams each were taken and labeled as Solutions A, B, and C. One gram of potassium hexafluorotitanate was added to Solution A. Two grams of potassium hexafluorotitanate was added to Solution B. Four grams of potassium hexafluorotitanate was added to Solution C. Solutions A and B thickened up slightly, but were able to be coated twenty-four hours after originally being mixed. Solution C had thickened up to the extent that the solution could not be coated.

Electrogalvanized steel panels were coated with each of the solutions, using a draw bar, and were cured to 310° F. (154.4° C.) peak metal temperature. The coated metal substrates had cured coating weights ranging from about 350–400 mg/ft$^2$.

As another variable, on separate panels, an organophosphatized pretreatment available from PPG Industries, Inc. as NUPAL was applied under each of the solutions. The pretreatment was applied via a squeegee roll and was cured to a peak metal temperature of about 170° F. (76.7° C.). These panels were tested for corrosion resistance in a neutral salt spray cabinet for 72 hours. The following chart shows the results of the solutions above:

| Coating | Pre-treatment | Result |
|---|---|---|
| Solution A | None | 20% white rust |
| Solution A | Organophosphatized | No white rust |
| Solution B | None | 10% white rust |
| Solution B | Organophosphatized | No white rust |

The data in the above table indicate that corrosion protection improves with the increased level of potassium hexafluorotitanate, as long as the composition is stable. Corrosion protection is particularly outstanding when the composition of the present invention is used in combination with an organophosphate pretreatment solution.

Example II

Mixtures were prepared using resins compatible with potassium hexafluorotitanate (PFT), to determine stability. The following observations were observed when resin emulsions were mixed neat with the heavy metal salt:

| Resin Tested | Resin Weight (grams) | PFT Weight (grams) | Observation |
|---|---|---|---|
| Rhoplex MV-1C | 41.2 | 1.9 | No noticeable change |
| Rhoplex MV-1C | 41.2 | 2.5 | Resins slightly thicker |
| Rhoplex MV-1C | 41.2 | 7.8 | Resins have curdled |
| Rhoplex MV-1C + (NH$_4$)OH | 39.2 | 4.2 | pH~6.3; no initial changes; curdling after three days |
| Emulsion E-1018 | 44.6 | 1.1 | No noticeable change |
| Emulsion E-1018 | 44.6 | 2.8 | No noticeable change |
| Emulsion E-1018 | 44.6 | 7.0 | No noticeable change |

Example III—Comparative

Coated panels were prepared to determine the suitability of potassium hexafluorotitanate as a corrosion-inhibitor at low coating weights. 7.5 grams of a dispersing agent (ACRYSOL I-62), five grams of deionized water, five grams of a flow control agent (propylene glycol), 1.25 grams of a coalescing agent (butyl CARBITOL), 0.5 grams of ammonium hydroxide, 3.75 grams of an aminoplast (DYNOMIN UM-15), 11.25 grams of a aqueous calcium fluoride slurry, a defoaming agent (DREWPLUS L-475), and 10.75 grams total of two silicon dioxide pigments (7.5 grams SHIELDEX AC-3 and 3.25 grams SYLOID C-809) were ground together into a paste. This paste was blended together with two resins (125.5 grams of thermoplastic resin RHOPLEX MV-1C and 32.5 grams of thermosetting resin EMULSION E-1018), 2.75 grams of a thickening agent (ENVIRON THICKENER), 18.25 grams of deionized water, and 2.5 grams of ammonium carbonate.

A composition containing a mixture of 25 grams, 15 grams, and 0.1 grams, respectively, of potassium hexafluorotitanate, water, and ammonium hydroxide was prepared (having a pH of about 11) and added to the composition described above. The mixture was added at a ratio of five parts of the total composition described above to one part of the potassium hexafluorotitanate mixture. Adding potassium hexafluorotitanate to the coating composition in admixture with ammonium hydroxide allowed for more stable compositions than that prepared in Example I. The final composition had a pH of about 6.7.

This composition was tested on electrogalvanized steel (EZG), hot dip galvanized steel, (HDG), and GALVANNEAL (GA). Panels were coated using a draw bar, and were cured to 310° F. (154.4° C.) peak metal temperature. The coated metal substrates had cured coating weights ranging from about 75–125 mg/ft$^2$.

As another variable, on separate panels, an organophosphatized pretreatment available from PPG Industries, Inc. as NUPAL was applied under each of the solutions. The pretreatment was applied via a squeegee roll and was cured to a peak metal temperature of about 170° F. (76.7° C.). These panels were tested for corrosion resistance in a neutral salt spray cabinet for 72 hours. The following chart shows the results of the solutions above:

| Substrate | Pretreatment | Result |
|---|---|---|
| EZG, bare (Control) | None | 100% white rust |
| EZG | None | 95–100% white rust |
| EZG | Organophosphatized | No white rust |
| HDG, bare (Control) | None | 100% white rust and 5% red rust |

-continued

| Substrate | Pretreatment | Result |
|---|---|---|
| HDG | None | 60–100% white rust |
| HDG | Organophosphatized | No white rust |
| GA, bare (Control) | None | 100% white rust and 80% red rust |
| GA | None | 80–100% white rust and 5–15% red rust |
| GA | Organophosphatized | 0–5% white rust |

The data in the above table indicate that a coating weight as low as 100 mg/ft$^2$ without the use of a pretreatment composition is not effective for inhibiting corrosion over steel substrates.

Example IV

Five compositions were prepared to compare various water-soluble and insoluble titanium fluoride and zirconium fluoride salts and acids as corrosion-inhibiting additives. Five samples with the following compositions were ground: 7.5 grams of a dispersing agent (ACRYSOL I-62), five grams of deionized water, five grams of a flow control agent (propylene glycol), 1.25 grams of a coalescing agent (butyl CARBITOL), 0.5 grams of ammonium hydroxide, 3.75 grams of a aminoplast (DYNOMIN UM-15), 11.25 grams of an aqueous calcium fluoride slurry, a defoaming agent (DREWPLUS L-475), and 10.75 grams total of two silicon dioxide pigments (7.5 grams SHIELDEX AC-3 and 3.25 grams SYLOID C-809). To each of the pastes prepared above, 125.5 grams of RHOPLEX MV-1C, 32.5 grams of EMULSION E-1018, 2.75 grams of a thickening agent (ENVIRON THICKENER), 18.25 grams of deionized water, and 2.5 grams of ammonium carbonate were added and blended together. The samples were labeled as Sample A, B, C, D, and E.

To Sample A (Comparative), 12.3 grams of hexafluorotitanic acid neutralized with ammonium hydroxide to a pH of 7.0, was added. To Sample B (Comparative), 11.8 grams of hexafluorozirconic acid neutralized with ammonium hydroxide to a pH of 8.0, was added. To Sample C (Comparative), 11.7 grams of calcium titanium fluoride, neutralized by mixing calcium hydroxide and hexafluorotitanic acid to a pH of 8.9, was added. To Sample D (Comparative), 11.8 grams of calcium zirconium fluoride, neutralized by mixing calcium hydroxide and hexafluorozirconic acid to a pH of 8.8, was added. To Sample E, 25.4 grams of potassium hexafluorotitanate, 15.3 grams of deionized water, and 0.1 grams of ammonium hydroxide are mixed together, then added to the composition.

Electrogalvanized steel panels were coated with each of the solutions, using a draw bar, and were cured to 310° F. (154.4° C.) peak metal temperature. The coated metal substrates had cured coating weights of about 350–400 mg/ft$^2$.

As another variable, on separate panels, an organophosphatized pretreatment available from PPG Industries, Inc. as NUPAL was applied under each of the solutions. The pretreatment was applied via a squeegee roll and was cured to a peak metal temperature of about 170° F. (76.7° C.). These panels were tested for corrosion resistance in a neutral salt spray cabinet for 72 hours.

The following chart shows the compositions and the results observed after 72 hours in a neutral salt spray test:

| Sample | Pretreatment | Results after 72 hours NSS |
|---|---|---|
| Sample A | None | 80–90% white rust |
| Sample A | Organophosphatized | 0–1% white rust |
| Sample B | None | No white rust |
| Sample B | Organophosphatized | No white rust |
| Sample C | None | 95–100% white rust |
| Sample C | Organophosphatized | 60–90% white rust |
| Sample D | None | 100% white rust |
| Sample D | Organophosphatized | 90% white rust |
| Sample E | None | No white rust |
| Sample E | Organophosphatized | No white rust |

The data in the above table indicate that the composition of the present invention (Sample E) is very effective as a corrosion inhibiting coating, and is equivalent in performance to the conventional compositions containing water-soluble zirconium acid salts (Sample B). Compositions containing water-soluble titanium acid salts (Sample A) and insoluble alkaline earth metal salts (Samples C and D) are not as effective as the composition of the present invention.

The composition of the present invention is an environmentally friendly treatment, which is effective for corrosion inhibition on multiple metallic substrates, while providing good adhesion for various protective and decorative coatings by its resistance to fingerprints. The composition of the present invention is useful as a non-chrome protective coating or primer for phosphated substrates and perhaps, more importantly, provides effective protection as a direct-to-metal coating (primer) on non-phosphated substrates.

We claim:

1. A curable emulsion coating composition essentially free of chromium comprising a continuous waterborne phase and a discontinuous phase, wherein the discontinuous phase comprises at least one water-insoluble, particulate film-forming thermoplastic resin, at least one water-insoluble, film-forming thermosetting resin, and at least one water-insoluble alkali metal salt of a heavy metal-containing acid wherein the heavy metal is selected from titanium, zirconium, and mixtures thereof, and wherein the salt is present in the coating composition in an amount of 0.05 to 15 percent metal by weight, based on the total weight of the composition.

2. The coating composition of claim 1, wherein the thermoplastic resin is present in the coating composition in an amount of 35 to 45 percent by weight, based on the total weight of the composition.

3. The coating composition of claim 1, wherein the thermosetting resin is present in the coating composition in an amount of 5 to 14 percent by weight, based on the total weight of the composition.

4. The coating composition of claim 1, wherein the discontinuous phase further comprises at least one crosslinking agent.

5. The coating composition of claim 4, wherein the crosslinking agent is an aminoplast.

6. The coating composition of claim 1, wherein the thermosetting resin is selected from the group consisting of acrylic polymers, vinyl polymers, polyesters, polyepoxides, and mixtures thereof.

7. The coating composition of claim 1, wherein the discontinuous phase further comprises a water-insoluble pigment which is a reaction product of an inorganic silicofluoride and an inorganic calcium compound selected from the group consisting of calcium oxide, calcium bicarbonate, $Ca(OH)_2$, $CaCO_3$ and mixtures thereof.

8. The coating composition of claim 1, wherein the thermoplastic resin comprises an acrylic copolymer.

9. The coating composition of claim 1, wherein the pH thereof is within the range of 6.5 to 12.

10. The coating composition of claim 1, wherein the heavy metal salt is potassium hexafluorotitanate.

11. A process for coating a metal substrate comprising the steps of:
   (a) contacting the substrate with a curable emulsion coating composition essentially free of chromium comprising a continuous waterborne phase and a discontinuous phase, wherein the discontinuous phase comprises at least one water-insoluble, particulate film-forming thermoplastic resin, at least one water-insoluble, film-forming thermosetting resin, and at least one water-insoluble alkali metal salt of a heavy metal-containing acid, wherein the heavy metal is selected from titanium, zirconium, and mixtures thereof, and wherein the salt is present in the coating composition in an amount of 0.05 to 15 percent metal by weight, based on the total weight of the composition; and
   (b) heating the substrate to a peak metal substrate temperature of 170 to 350° F. (77 to 177° C.), wherein the coated metal substrate has a cured coating weight of 250–400 mg/ft$^2$.

12. The process of claim 11, wherein the metal substrate is untreated.

13. The process of claim 11, further comprising the step of pretreating the substrate with a solution selected from the group consisting of a metal phosphate solution, an organophosphate solution, an organophosphonate solution, and combinations thereof, prior to contacting the metal substrate with the curable emulsion coating composition.

14. The process of claim 11, wherein the metal substrate is contacted with the emulsion coating composition by roller application.

15. The process of claim 11, wherein the thermoplastic resin is present in the emulsion coating composition in an amount of 35 to 45 percent by weight, based on the total weight of the emulsion coating composition.

16. The process of claim 11, wherein the thermosetting resin is present in the emulsion coating composition in an amount of 5 to 14 percent by weight, based on the total weight of the emulsion coating composition.

17. The process of claim 11, wherein the discontinuous phase of the emulsion coating composition further comprises at least one crosslinking agent.

18. The process of claim 17, wherein the crosslinking agent is an aminoplast.

19. The process of claim 11, wherein the thermosetting resin is selected from the group consisting of acrylic polymers, vinyl polymers, polyesters, polyepoxides, and mixtures thereof.

20. The process of claim 11, wherein the discontinuous phase of the emulsion coating composition further comprises a water-insoluble pigment which is a reaction product of an inorganic silicofluoride and an inorganic calcium compound selected from the group consisting of calcium oxide, calcium bicarbonate, Ca(OH)$_2$, CaCO$_3$ and mixtures thereof.

21. The process of claim 11, wherein the thermoplastic resin comprises an acrylic copolymer.

22. The process of claim 11, wherein the pH of the emulsion coating composition is within the range of 6.5 to 12.

23. The process of claim 11, wherein the heavy metal salt is potassium hexafluorotitanate.

24. The process of claim 11, wherein the metal substrate is selected from steel surface-treated with any of zinc metal, zinc compounds and zinc alloys; aluminum; aluminum alloys; zinc-aluminum alloys; aluminum plated steel; and aluminum alloy plated steel substrates.

25. The process of claim 11, wherein the metal substrate is a combination of two or more metal substrates assembled together.

26. The process of claim 11, wherein the coated metal substrate has a cured coating weight of 350–400 mg/ft$^2$.

* * * * *